United States Patent [19]

Ciciora

[11] 4,333,109
[45] Jun. 1, 1982

[54] INTELLIGENT TELETEXT DECODER

[75] Inventor: Walter S. Ciciora, Park Ridge, Ill.

[73] Assignee: Zenith Radio Corporation, Glenview, Ill.

[21] Appl. No.: 114,930

[22] Filed: Jan. 24, 1980

[51] Int. Cl.$^3$ .................. H04N 5/14; H04N 7/04
[52] U.S. Cl. .................................. 358/147; 358/167
[58] Field of Search ................ 455/65; 358/160, 167, 358/147, 905; 375/14, 101

[56] References Cited

U.S. PATENT DOCUMENTS

| | | | |
|---|---|---|---|
| 3,283,063 | 11/1966 | Kawashima et al. | 358/167 |
| 4,044,381 | 8/1977 | Shimano et al. | 358/160 |
| 4,091,418 | 5/1978 | Ciciora | 358/160 |

OTHER PUBLICATIONS

Goyal and Armfield, "Reception of Teletext Under Multipath Conditions", IEEE Transactions on Consumer Electronics, Jul. 1979.
Ciciora et al., "Tutorial on Ghost Cancelling in Television Systems", IEEE Transactions on Consumer Electronics, Feb. 1979.
Thedick, "Adaptive Multipath Equalization for TV Broadcasting", IEEE Transactions on Consumer Electronics, May 1977.
Lucky, "Automatic Equalization for Digital Communication", B.S.T.J., Apr. 1965.
Lucky, "Techniques for Adaptive Equalization of Digital Communication Systems", B.S.T.J., Feb. 1966.
"This is Oracle", a brochure.
"Teletext", a brochure.
Ciciora et al., "An Introduction to Teletext and Viewdata with Comments on Compatibility".
Neal and Goyal, "A Frequency Domain Interpretation of Echos and Their Effect on Teletext Data Reception".
Suzuki et al., "Television Receiver Design Aspects for Employing Teletext LSI", IEEE Transactions on Consumer Electronics, Jul. 1979.
"Multitext-Signetics Technical Information", Mullard, 1978.

Primary Examiner—Jin F. Ng
Attorney, Agent, or Firm—Jack Kail; John Coult

[57] ABSTRACT

An equalizer and decoder system compensating for multipath distortion in digital format signals sent by teletext, for example. The system loads demodulated data signals and a received reference signal into a charge coupled device clocked in real time by a clock circuit. Later, the reference pulse is clocked to a microprocessor which determines tap coefficients for a transversal filter to correct the multipath distortion in the reference signal. The data signals are then applied to a transversal filter weighted with the calculated tap weights. After filtering, signals are decoded by the microprocessor.

In another embodiment a charge coupled device with tapped stages is used at one time for receiving the data signals in real time, and at a later time for part of a transversal filter.

In a simplest embodiment, distortions are removed by the microprocessor itself, without any separate transversal filter.

12 Claims, 5 Drawing Figures

INTELLIGENT TELETEXT DECODER

BACKGROUND OF THE INVENTION

The present invention relates generally to telecommunications and, more particularly, to improvements in communication of textual data in digital format via television, such as teletext systems.

Teletext refers generally to a system for communicating textual information in a digital format via an appropriately modified broadcast television transmitter and receiver. It is a product of the constant effort in modern civilization to provide improved communication, and specifically to find increased uses for television. Television can be used to broadcast textual information in the typical video picture format, but teletext systems increase efficiency since they communicate textual information simultaneously with typical program transmission. In the various systems throughout the world for teletext, including ORACLE in the United Kingdom, Antiope in France, and the trial teletext systems in the United States, information is transmitted from a transmission station to multiple recipients during the so-called "vertical interval." For those who are unfamiliar with television operation and this vertical interval, a television receiver includes a cathode ray tube which generates an electron beam. The electron beam scans, i.e. moves from left to right, the cathode ray tube at a predetermined rate. When the electron beam reaches the right side of the tube, it is blanked (made invisible) and caused to retrace rapidly to the left side of the tube but one line lower to continue forming an image on the television screen. When the electron beam reaches the bottom of the screen, internal blanking circuits darken the beam so that it does not produce an image, and a vertical sweep circuit causes the dark beam to retrace to the top of the screen. The time during which that darkening and retracing occurs is the vertical interval.

In the United States, the time which this vertical interval occupies is approximately 1333 microseconds, which approximates the time required for scaning twenty-one horizontal (display) lines. Thus, Twenty-one lines which are not used for viewing the television image are available for other types of communication.

Normally the teletext system communicates the textual information in a digital rather than video format, but the teletext signals are, in fact, analog representations of digital bits. The digital format is used because under present technology a piece of information such as an alphabetical letter can be telecommunicated in less time using digital techniques than video ones. Typically, at the transmitter, the textual information is digitally encoded according to American National Standards Code for Information Interchange (ASCII) format and is often protected by a Hamming code. The digital format data is transmitted during the vertical interval, and the received signal is demodulated, decoded and generally stored for subsequent use or, less often, displayed immediately on the television screen.

For normal video broadcasts, particularly in urban regions, the transmitted signal may reach a particular receiver by more than one path due to reflections of the transmitted signal off of buildings or other objects. This phenomenon, known as multipath, creates a disturbing and unpleasant video display. The distortion caused to digital data, however, is of a different and vastly more destructive character due to overlapping of digital bits of information. This is called intersymbol interference.

Linear distortion can be overcome, theoretically, as set forth more particularly by H. A. Wheeler, "The Interpretation of Amplitude and Phase Distortion in Terms of Paired Echoes," *Proc. I.R.E.*, Vol. 27, June 1939, pp. 359–385. Paired-echo theory indicates that linear types of distortion can be approximated in terms of appropriate sets of paired echoes displaced in time about the undistorted transmitted signal. Specifically, linear distortions consist of the undistorted transmitted signal plus at least one pre-echo similar in shape to the undistorted signal, but preceeding it in time by some amount $t_1$, and a corresponding post-echo also similar in shape to the undistorted signal but following it in time by the same amount of time $t_1$. Generally, all linear distortions, regardless of origin, can be expressed as a sum of pre-echo and post-echoes of the undistorted signals. The process of removing distortions from a communication channel, including ghosts, is referred to as channel equalization and is implemented by devices known as channel equalizers.

Channel equalization has been proposed for teletext, but a workable system has not been developed. In S. K. Goyal and S. C. Armfield, "Reception of Teletext under Multipath Conditions," *IEEE Transactions on Consumer Electronics*, Vol. CE-25, No. 3, (July 1979), Goyal and Armfield suggested the use of a transversal filter in combination with an appropriate training waveform to maintain data reliability despite multipath distortion. They simulated a deghosting system using transversal filters with variable tap weights with one of four different training wave forms. After appropriate adjustment of the tap weights, the ghosted data was passed through the filter for deghosting and consequent improvement in the eye pattern, indicating increased reliability of digital data. Goyal and Armfield conducted their experiment on an IBM 370/168 computer in conjunction with a digital frame store system with eight bit resolution and a sampling rate four times the subcarrier frequency. Following the teachings in W. Ciciora, G. Sgrignoli and W. Thomas, "A Tutorial on Ghost Cancelling in Television Systems," *IEEE Trans. on Consumer Elec.*, Vol. CE-25, No. 1, pp. 9–44 (February 1979), as well as those of H. Thedick, "Adaptive Multipath Equalization for TV Broadcasting," *IEEE Trans. on Consumer Elec.*, Vol. CE-23, No. 2, pp. 175–181 (May 1977); E. Arnon, "An Adaptive Equalizer for Television Channels," *IEEE Trans. on Comm. Tech.*, Vol. Com. 17, pp. 726–734 (Dec. 1969); and K. Yamamoto, N. Yamaguchi, N. Miyata, "Ghost Reduction Systems for Television Receivers," *IEEE Trans. on Consumer Electronics*, Vol. CE-23, pp. 327–344 (August 1977), Goyal and Armfield found a feed-forward transversal filter operating on a baseband signal to be an acceptable deghosting method. They simulated an adaptive deghosting system using a 128-tap transversal filter with various types of training signals. The tap weights were adjusted by running the training waveform for five hundred passes to calculate the tap coeffecients. After such adjustment, they found that the adaptive equalization improved data reliability. Clearly, equipping every teletext recipient with an IBM 370 computer at a cost of over one million dollars per computer is not a feasible solution for enhancing teletext data reliability.

Another proposal or plan for equalization of digital data involves PBS' Captioning for the Deaf system, which displays textual information at the bottom of the television screen along with the transmitted video image. The PBS signal format includes an adaptive equalizer reference signal which is transmitted every eigth frame. An associated multipath filter may be microcomputer based as set forth in Thedick, op. cit. However, it would suffer significant speed limitations, as it once samples the reference pulse each time it appears—once each eight frames. Data about the reference pulse would very slowly be built up on a memory, and a filter would adaptively equalize the communication. Such a system would not effectively equalize the channel in a high data rate system.

Therefore, the main object of the present invention is to improve the reliability of textual data communications via television at a modest cost.

A further object is to provide an improved system which does not require a large and powerful computer.

A further object is to provide an improved teletext decoder arrangement.

Another object is to equalize teletext signals to overcome multipath distortion.

BRIEF DESCRIPTION OF THE DRAWINGS

The foregoing and other objects are achieved by the invention defined by the appended claims. Preferred embodiments of the invention are described below with reference to the accompanying drawings wherein:

DESCRIPTION OF PREFERRED EMBODIMENTS

Figure 1:
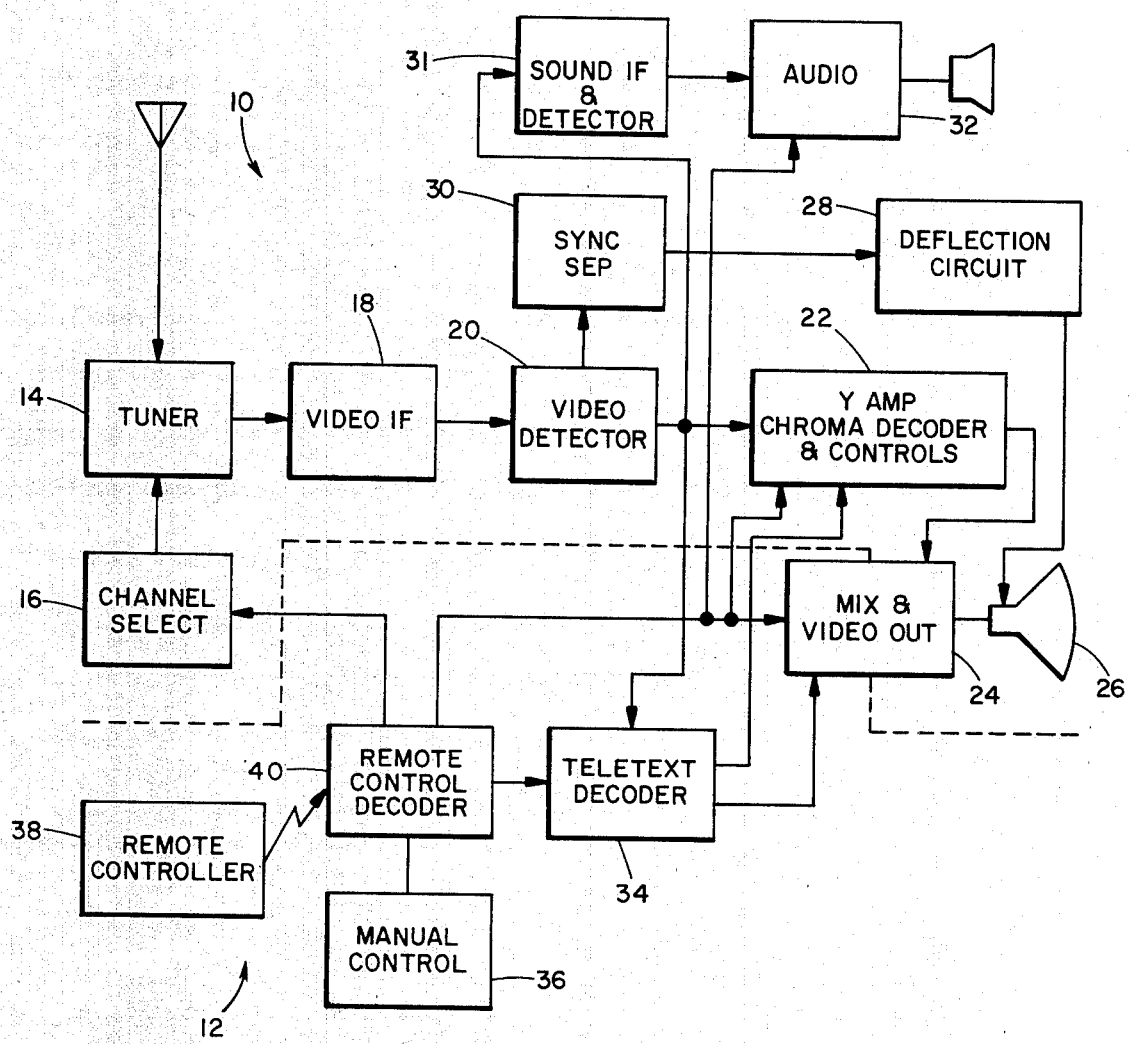
FIG. 1 is a block diagram of a typical television receiver equipped with apparatus for receiving teletext information.

FIG. 1 illustrates a typical television color receiver 10 (above the dotted line) equipped with a teletext receiver section 12 and its supporting control apparatus (below the dotted line). The receiver 10 includes the typical tuner 14, channel selector 16, a video demodulator including an intermediate frequency section 18 and detector 20, a chroma decoder, amplifier and control section 22, a mixer and video output stage 24, a cathode ray tube (CRT) 26, a deflection circuit 28 controlled by a sync separator 30 which is coupled to video detector 20, and sound detector. The teletext section 12 includes a teletext decoder 34 receiving demodulated signals from the video detector 20. Control of various functions, such as requests for channel identification, time display, index page display, textual updating activation or deactivation, or superimposition of the text on the normal television picture, for instance, is provided via a manual controller 36 or a remote controller 38 cooperating with a remote control decoder 40. The teletext section 12 shares the mixer and video output stage 24. In operation, teletext receiver section 12 receives demodulated digital data, decodes it and holds the data in accordance with user entered commands via a controller 36 and 38. When a display command is entered, for example, the receiver 12 interrupts commercial television programming and causes a page of text to be displayed on CRT 26. Teletext decoder 34 outputs the blanking, synchronizing and chroma signals necessary for proper CRT operation.

The receiver shown in FIG. 1 includes no equalizer for overcoming multipath distortion. I have found that "time base expansion," described fully in my U.S. Pat. No. 4,091,418, "Automatic Channel Equalization with Time Base Expansion," which is hereby incorporated herein by this reference, can be salutorily applied to digital communication via television. In my prior patent, a television receiver was improved by including a charge coupled device (CCD) which received analog data including a reference signal at one rate and clocked it to a control section at a slower rate. Due to the manageable speed, the control section adjusted tap weights on a transversal filter, thereby to equalize adaptively the channel and counteract the effects of multipath distortion.

Figure 2:
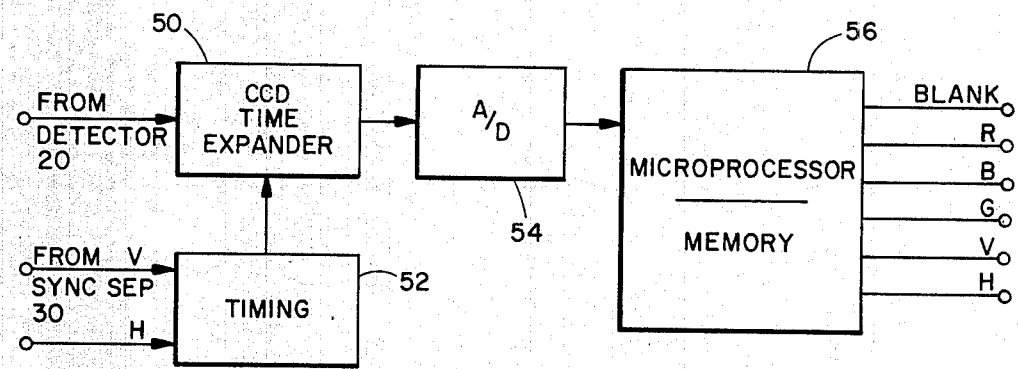
FIG. 2 is a block diagram of a first embodiment of an improved teletext decoder according to the present invention.

Time base expansion apparatus is shown in FIG. 2 which illustrates one embodiment of a teletext decoder according to the present invention. In FIG. 2, a CCD time expander 50 is clocked by a timing circuit 52 to receive demodulated teletext signals from detector 20. The timing circuit 52 receives inputs from the vertical and horizontal outputs of sync separator 30 (FIG. 1) and clocks the CCD time expander 50 only when teletext signals are received. Thus, time expander 50 does not admit video display signals, which are processed by conventional techniques in the television receiver 10. Typically, textual information is sent over a teletext system only one or two lines (of text) at a single time, and the number of stages in CCD time expander 50 is sufficient to admit all the data transmitted in teletext format in a single field of video. After the demodulated but still "ghosted" information is clocked into time expander 50, timing circuits 52 clock the data out at a slower rate than it was received to ease the computing requirements for equalization. The data signals are applied via a suitable analogue to digital (A/D) converter 54, such as a successive approximation type converter, to a microprocessor 56. Microprocessor 56 applies equalization algorithms to the digital data signals to remove the distortions suffered between the transmitter and the receiver and even distortions originating inside the receiver. The Lucky algorithm, for example, and others as are well known to those skilled in the art, can be used. Microprocessor 56 then decodes the data. Typically, the system will store the deghosted data in some memory device such as a random access memory (RAM) or circulating memory such as a CCD or bubble memory. When the system user requests a display, microprocessor 56 will read the deghosted data and decode it by referring to a read-only memory (ROM), for example, which contains full information for converting from ASC II code to alphanumeric symbols. Decoding of teletext data is not set forth elaborately here inasmuch as it is within the skill of the art. Alternatively, the system may decode the teletext data and store decoded data in a memory device. In any event, microprocessor 56 outputs signals for blanking, three chroma signals and two timing signals.

Figure 3:
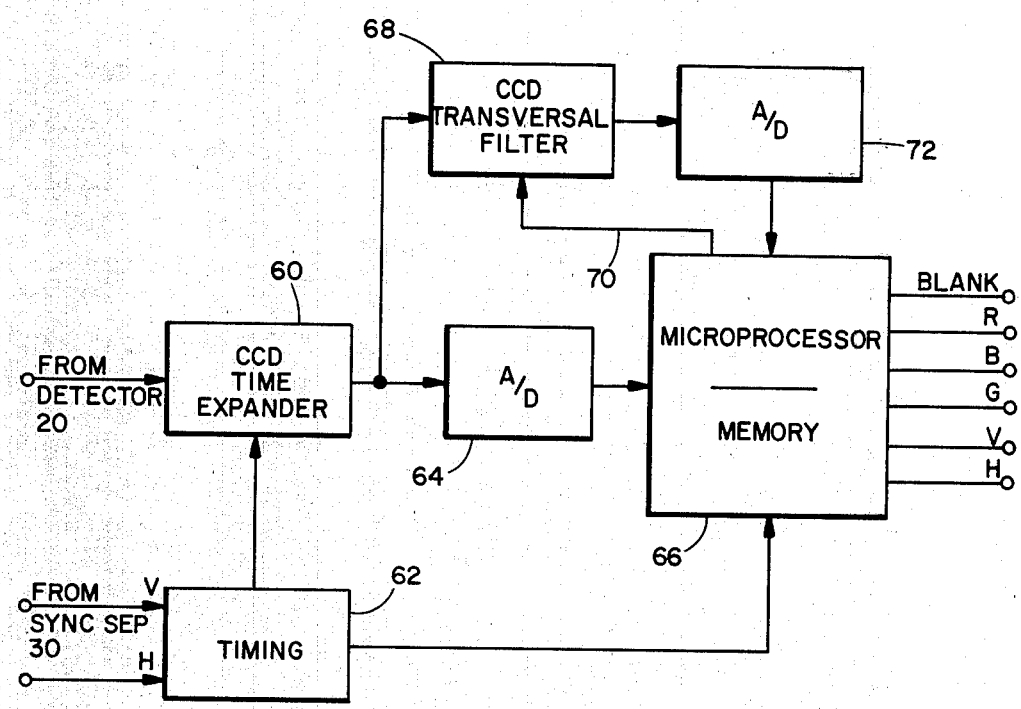
FIG. 3 is a block diagram of a second embodiment of an improved teletext decoder according to the present invention.

A second embodiment of an adaptive equalizer for teletext according to the present invention is shown in FIG. 3, where the demodulated teletext data and reference signals are clocked into a CCD time expander 60 by timing circuits 62. The reference signals are applied via an A/D converter 64 to a microprocessor 66 equipped with a memory. The transmitted reference signals have known characteristics, and the microprocessor, in accordance with known techniques, compares the reference signals as received with a local reference stored within microprocessor 66 to calculate the necessary tap weights to enable a transversal filter 68 to correct the distortions in the reference signal. The tap weight signals are applied to filter 68 via a data bus 70. Next, the textual data (still an analog representation of digital data) are clocked at a slower rate determined by timing circuits 62 into and through filter 68 where they are equalized. The equalized data is next applied to a second A/D converter 72 for digitizing, i.e. symbol decision, after which they are applied to microprocessor 66 for decoding and/or storage for subsequent use. Synchronizing, blanking, and chroma signals are also provided by microprocessor 66.

Figure 4:
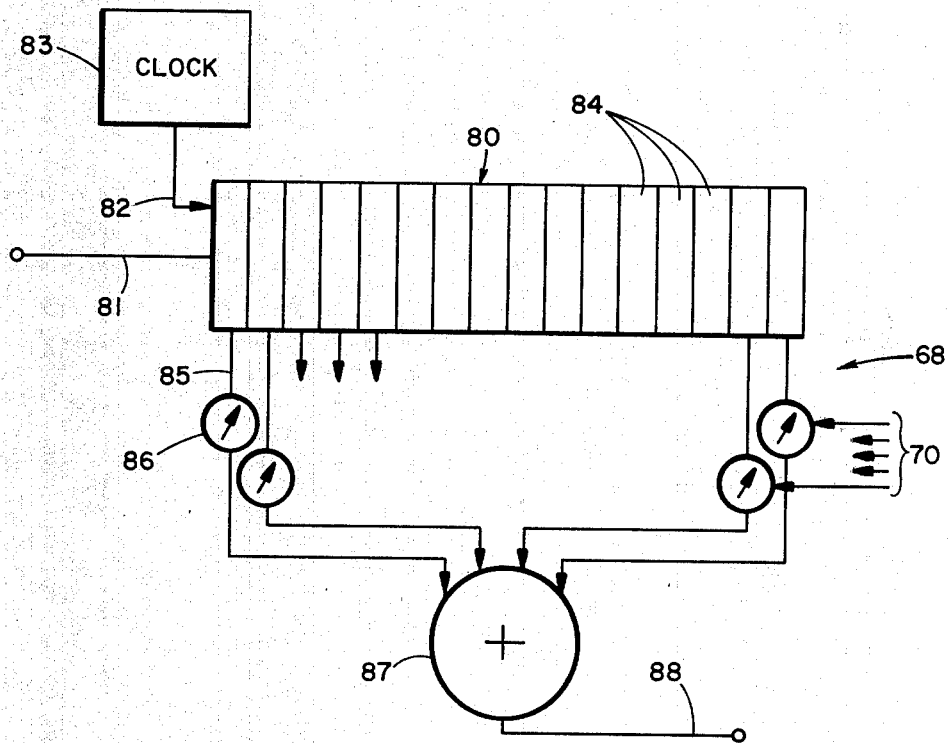
FIG. 4 is a block diagram of a CCD transversal filter which may be used in the embodiment of FIG. 3.

FIG. 4 illustrates CCD transversal filter 68. Such a filter is presently commercially available from various companies, such as Reticon, for instance. Normally, the data rate from teletext signals is far too high for real time adjustment of a CCD transversal filter. But with use of the time expander 60, the relatively inexpensive and commercially available CCD transversal filters can be used for equalization, thereby to enhance teletext reliability. In FIG. 4, a CCD 80 includes a data input 81 and a clock pulse input 82 for pulses from a clock 83. CCD 80 includes a plurality of stages 84, each of which has an associated tap 85. Each such tap 85 couples the signal at its corresponding stage to a respective weighting device 86 which responds to signals from bus 70. Weighted signals are outputted by each device 86 and applied to a summer 87 which accumulates the weighted signals. An output 88 of summer 87 provides the output of filter 68.

Figure 5:
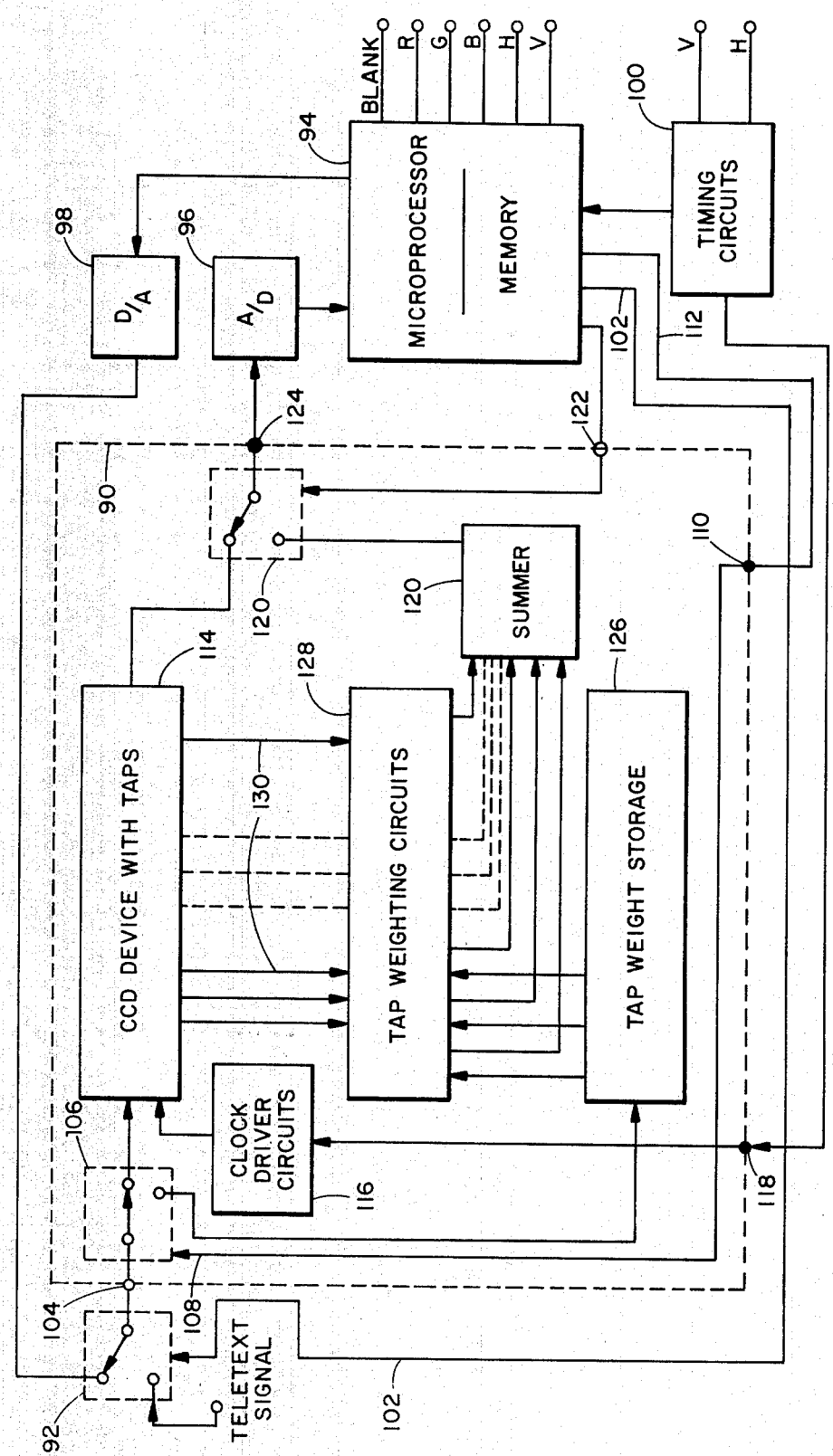
FIG. 5 is a block diagram of a third embodiment of an improved teletext decoder according to the present invention.

FIG. 5 illustrates a third embodiment of an adaptive equalizer for teletext decoder according to the present invention wherein a CCD time expander and a CCD transversal filter are combined as one integrated circuit 90 for cost and space efficiency. Integrated circuit 90 cooperates with an input selection switch device 92, a microprocessor with associated memory 94, an analog-to-digital (A/D) converter 96, a digital-to-analog (D/A) converter 98 and timing circuits 100. It will be understood that A/D and D/A converters 96 and 98 may be incorporated in circuit 90 if desired.

Circuit 90 functions both as a time expander and a filter. In the first step of operation, switch device 92 is controlled by microprocessor 94 via a control lead 102 to pass a line of reference training signals received and demodulated by television receiver section 10 (FIG. 1) to a signal input terminal 104.

An internal input switch device 106 has its input coupled to the signal input terminal 104 and has two outputs. Switch operation is controlled by microprocessor 94 via a lead 108 coupled to a terminal 110 of circuit 90 which, in turn, is connected to an output 112 of microprocessor 94. During the first step of operation, internal input switch device 106 passes the reference training signals to a tapped CCD device 114. Clock driver circuits 116, coupled via a terminal 118 to timing circuits 100, clock CCD 114 at the normal teletext data transmission rate so that the reference training signals are received by and clocked into the stages of CCD 114.

After the reference training signals are loaded in CCD 114, timing circuits 100 and clock driver 116 clock the reference training signals out of CCD 114 at a relatively slow rate so that CCD 114 is used as a time base expander. The reference training signals are passed through an internal output selector switch device 120 whose position is microprocessor-controlled via a terminal 122. The reference training signals are applied to A/D converter 96 via an output terminal 124 which receives the output from switch 120. The reference training signals are digitized and then passed to microprocessor 94 which calculates tap weights therefrom for proper equalization.

In the second step of operation, after the reference training signals are clocked out of CCD 114, microprocessor 94 changes the positions of switches 92 and 106. The computed tap weights are converted to analog format by D/A converter 98 and directed by switch devices 92 and 106 to a tap weight storage 126 within integrated circuit 90.

After this is accomplished, the system is prepared to accept teletext data signals in the third step of operation. Switch devices 92 and 106 are controlled by microprocessor 94 to couple demodulated teletext signals from receiver section 10 to CCD 114. In this step, CCD 114 is again clocked at the normal teletext data transmission rate by clock driver circuits 116 and timing circuits 100 so that the teletext data signals are indeed received by and clocked into CCD 114. This continues until a full line of teletext data is loaded into CCD 114.

In the fourth step of operation, equalization occurs. A set of tap weighting circuits 128 receives tap weights from tap weight storage 126 and receives teletext data signals from CCD 114 via CCD taps 130. The weighted teletext data signals are inputted from tap weighting circuits 128 to a summer 132 which sums the signals. Output selector switch device 120 is moved to its second position by microprocessor 94 and the equalized teletext data signals are outputted through switch device 120 to output terminal 124. After conversion to digital format by A/D converter 96, the data are applied to microprocessor 94 for decoding and/or storage in the memory section for subsequent use.

It is to be understood that the sequencing of operation can be varied so long as reference training signals and teletext data signals are appropriately processed by integrated circuit 90 and microprocessor 94.

The foregoing illustrative embodiments show how a transversal filter can be adjusted to adaptively equalize data despite the extreme baud rate of teletext communication. It will be understood that this arrangement can be applied also for captioning, which merely calls for immediate display rather than storage, or other types of digital communication links. By use of time base expansion, a microprocessor, which costs a fraction of an otherwise necessary large frame computer, can be used to adjust a transversal filter to overcome multipath distortions. Many variations fully within the scope of the present invention, defined by the appended claims, will be or become apparent to those skilled in the art.

What is claimed is:

1. A combination automatic equalization and decoder system for a receiver which receives both transmitted digital format data signals and a transmitted reference signal, said system equalizing said digital data signals according to the distortion exhibited by said reference signal and decoding said data signals, comprising:

a time base expander having an input for receiving and moving said digital format data signals at a selectable rate to an output;

means including a microprocessor for determining the distortion exhibited by said reference signal and for operating on data signals inputted thereto to remove distortions therefrom based on said reference signal distortion;

means coupling said time base expander output to the input of said microprocessor; and timing circuit means controllingly coupled to said time base expander and coupled to said microprocessor for regulating the rate at which said time base expander moves the data, said timing circuit means causing said time base expander to receive said transmitted digital format data signals at a first rate and later causing said data signals to move to said output at a slower second rate;

said microprocessor including means decoding and outputting said data signals.

2. The system according to claim 1 wherein said distortion removing means comprises an equalizer adjustably coupled to said microprocessor, said microprocessor being coupled to receive said reference signal and being coupled to cause said equalizer to remove distortions from said reference signal, said equalizer being coupled to receive data signals from said time base expander, whereby said equalizer adjusts said data signals in the same manner by which said reference signal is corrected.

3. The system according to claim 2 wherein said time base expander and said equalizer are combined in an integrated circuit having an input circuit and including:
(a) a tapped charge coupled device having a data input coupled to said input circuit;
(b) tap weight storage coupled to said input circuit;
(c) tap weighting circuits coupled to receive signals from said charge coupled device and said tap weight storage; and
(d) a summer coupled to receive signals from said tap weighting circuits;
said decoder including means coupling said summer output and said charge coupled device output to said microprocessor, said microprocessor being coupled to said input circuit.

4. The system according to claim 3 wherein said input circuit comprises:
input selection means controllably coupled to said microprocessor for selectively receiving tap weight signals from said microprocessor or said digital format data signals and for selectively routing selected ones of those signals to said charge coupled device or said tap weight storage.

5. The system according to claim 3 or 4 wherein said means coupling said summer output and said charge coupled device output to said microprocessor comprises an output selection switch controllably coupled to said microprocessor for selectively coupling signals outputted from said charge coupled device or said summer output to a data input of said microprocessor.

6. The system according to claim 1, 2, 3 or 4 further comprising a memory coupled to said microprocessor, said microprocessor storing decoded data in said memory for subsequent availability.

7. The system according to claim 1, 2, 3 or 4 wherein said means coupling said time base expander to said microprocessor includes an analog to digital converter.

8. The system according to claim 3 wherein said timing circuit means includes a clock driver circuit within said integrated circuit.

9. The system according to claim 2 wherein said equalizer comprises a transversal filter with selectable tap weights controllably coupled to said microprocessor.

10. The system according to claims 1 or 2 wherein said time base expander comprises a charge coupled device.

11. A combination multipath distortion compensator and decoder system for use in a receiver which receives transmitted digital format data signals and a transmitted reference signal, said system compensating all of the signals in accordance with the distortion in the received reference signal, comprising:
(a) microprocessor means having an associated memory for receiving said reference signal and for calculating tap weights for a transversal filter to compensate for the distortion in said received reference signal;
(b) a charge coupled device with a data output stage and with taps at stages thereof;
(c) tap weight storage means for receiving and storing tap weights calculated by said microprocessor means;
(d) input routing means coupled to said microprocessor means for routing said calculated tap weights to said tap weight storage, and for routing data signals inputted to said combination system to said charge coupled device;
(e) tap weighting circuits coupled to receive data signals from said taps and coupled to receive tap weights from said tap weight storage for weighting data signals in accordance with tap weights;
(f) summing means for receiving and summing said weighted data signals;
(g) means coupling the output of said summing means and said data output stage to said microprocessor means;
(h) clock circuit means coupled to said charge coupled device for clocking data into and out of said charge coupled device at selected rates;
said clock circuit clocking said data signals into said charge coupled device in real time and subsequently clocking said data signals out of said charge coupled device at a rate compatable with the data handling capabilities of said microprocessor means, whereby said microprocessor means receives said data signals and calculates said tap weights;
said microprocessor means also decoding data signals received from said summing means.

12. The system of claim 11 wherein said clock circuit means is further coupled to said microprocessor means, and said input routing means is controllably coupled to said microprocessor means, said clock circuit means and microprocessor means causing said charge coupled device to be used at one time period for time expansion and at a second time period for a transversal filter portion.

* * * * *